United States Patent
Gehm

(10) Patent No.: US 10,274,392 B2
(45) Date of Patent: Apr. 30, 2019

(54) CONTROL SYSTEM, PRESSURE DETECTION SYSTEM, METHODS AND PROGRAMS THEREFOR

(71) Applicant: William J. Gehm, Lisle, NY (US)

(72) Inventor: William J. Gehm, Lisle, NY (US)

(73) Assignee: BAE Systems Controls Inc., Endicott, NY (US)

( * ) Notice: Subject to any disclaimer, the term of this patent is extended or adjusted under 35 U.S.C. 154(b) by 191 days.

(21) Appl. No.: 14/843,447

(22) Filed: Sep. 2, 2015

(65) Prior Publication Data

US 2016/0061684 A1 Mar. 3, 2016

Related U.S. Application Data

(60) Provisional application No. 62/045,282, filed on Sep. 3, 2014.

(51) Int. Cl.
| | | |
|---|---|---|
| *G01L 27/00* | (2006.01) | |
| *G05B 15/02* | (2006.01) | |
| *G01L 19/04* | (2006.01) | |
| *G01L 19/00* | (2006.01) | |

(52) U.S. Cl.
CPC .......... *G01L 27/005* (2013.01); *G01L 27/00* (2013.01); *G01L 27/002* (2013.01); *G01L 27/007* (2013.01); *G05B 15/02* (2013.01); *G01L 19/0092* (2013.01)

(58) Field of Classification Search
CPC ................................................. G01L 27/005
See application file for complete search history.

(56) References Cited

U.S. PATENT DOCUMENTS

| | | | | |
|---|---|---|---|---|
| 4,866,988 A | * | 9/1989 | Brown | G01L 9/0005 73/702 |
| 2010/0024517 A1 | * | 2/2010 | Ratner | G01L 15/00 73/1.57 |
| 2010/0130889 A1 | * | 5/2010 | Toth | G01L 1/205 600/587 |
| 2012/0060584 A1 | * | 3/2012 | Hobmeyr | G01L 27/005 73/1.57 |
| 2014/0165692 A1 | * | 6/2014 | Rannow | F15B 19/002 73/1.63 |
| 2016/0265520 A1 | * | 9/2016 | Skinner, Jr. | F04B 49/065 |

OTHER PUBLICATIONS

Hernik, Yuval, "Facts at a Glance", Jan. 1, 2011, Vishay Precision Group.*

* cited by examiner

*Primary Examiner* — Son T Le
*Assistant Examiner* — Herbert K Roberts
(74) *Attorney, Agent, or Firm* — Scully Scott Murphy & Presser PC

(57) ABSTRACT

A multiple channel control system, pressure detection system, a method and a program are provided. A pressure detection system may include first and second pressure transducers having a common pressure source as an input. The first pressure transducer is a different type than the second pressure transducer. The system also includes a storage device configured to store a look up table having a calibrated relationship between temperature and pressure for the second pressure transducer. The system also includes a processor configured to periodically update the look up table based on pressure detected by the first pressure transducer when a condition is met.

11 Claims, 9 Drawing Sheets

CONTROL SYSTEM, PRESSURE DETECTION SYSTEM, METHODS AND PROGRAMS THEREFOR

CROSS-REFERENCE TO RELATED APPLICATIONS

This application claims the benefit under 35 U.S.C. § 119(e) of U.S. Provisional Application Ser. No. 62/045,282, filed Sep. 3, 2014. The entire contents and disclosure of the aforementioned provisional application is incorporated by reference as if fully set forth herein.

FIELD OF THE DISCLOSURE

The present disclosure relates to pressure detection. More particularly, the present disclosure relates to a system, a method and a program for detecting pressure. The present disclosure further relates to a control system having pressure detection.

BACKGROUND

High accuracy pressure transducers are required to meet customer specifications and performance requirements over a dynamic operation range including over all possible environmental conditions and end of life requirements. High accuracy pressure transducers are expensive and can account for a significant cost of the materials for a control system.

SUMMARY

Disclosed are a pressure detection system, a method and a program for detecting pressure.

The pressure detection system comprises two different pressure transducers. One of the pressure transducers is a high accuracy pressure transducer and the other is a less accurate pressure transducer. The output of the high accuracy pressure transducer is used to recalibrate the less accurate pressure transducer. Both pressure transducers have a common pressure source as an input. The pressure detection system further comprises a processor configured to periodically update a look up table for the less accurate pressure transducer based on pressure detected by the high accuracy pressure transducer. In an aspect of the disclosure, the difference between the detected pressures from both transducers is used to update the look up table. A final pressure is detected based on the detected pressures from both pressure transducers and information in the look up table.

Also disclosed is a computer readable storage device having a program of instructions, which when executed by a processor causes the processor to compare received pressure detection results from a first pressure transducer and a second pressure transducer where one of the detection results is adjusted and update a look up table having a relationship between pressure and temperature for the second pressure transducer based on the result of the comparing when a condition is satisfied.

Also disclosed is a multiple channel control device. The multiple channel control device comprises a plurality of electronic circuit cards, at least one pair of pressure transducers, a pressure manifold, an electrical signal interface harness and a signal interface assembly. Each of the plurality of electronic circuit cards comprises a control circuit and memory. One of the plurality of electronic circuit cards is a master circuit card. The remaining electronic circuit cards are stand-by cards. Each of the plurality of electronic circuit cards is capable of communicating with each other.

Each pair of pressure transducers comprises a first pressure transducer and a second pressure transducer. The first pressure transducer is a different type than the second pressure transducer.

The pressure manifold comprises an opening with a nipple inserted therein. The nipple is configured to be coupled to a pressure communication means for communicating pressure from a port in a downstream component and the multiple channel control device. The pressure transducers are mounted to the pressure manifold.

The pressure manifold has a channel extending between a location where the first pressure transducer is mounted to the pressure manifold and a location where the second pressure transducer is mounted to the pressure manifold. The channel is in communication with the nipple. The pressure manifold further has a plurality of interconnecting passages intersecting the channel providing communication between the channel and the first pressure transducer and the second pressure transducer, respectively.

The electrical signal interface harness is coupled to the at least one pair of pressure transducers. The harness is configured to communicate signals from the at least one pair of pressure transducers.

The signal interface assembly comprises a plurality of connectors. One connector mates with the electrical signal interface harness. Other connectors, respectively, mate with the plurality of electronic circuit cards. Further, other connectors, respectively, mate with external signal cables. Signals from the first pressure transducer and the second pressure transducer are respectively communicated to a respective electronic circuit card by the electrical signal interface harness and the signal interface assembly.

The memory in each of the plurality of electronic circuit cards stores a look up table having a calibrated relationship between temperature and pressure for the second pressure transducer.

The control circuit in each of the electronic circuit cards is configured to periodically update the look up table based on pressure indicated by a signal received from the first pressure transducer when a condition is met. The control circuit is further configured to determine the pressure at a port in a downstream component using pressure indicated by a signal from the first pressure transducer and a corrected pressure determined from the look up table using pressure indicated by a signal from the second pressure transducer. The control circuit is further configured to generate at least one control parameter for the downstream component based in part on the determined pressure.

The electronic circuit card which is the master circuit card communicates the generated at least one control parameter to the downstream component.

BRIEF DESCRIPTION OF THE DRAWINGS

Aspects of the disclosure are further described with reference to the following drawings wherein.

DETAILED DESCRIPTION

Figure 1:
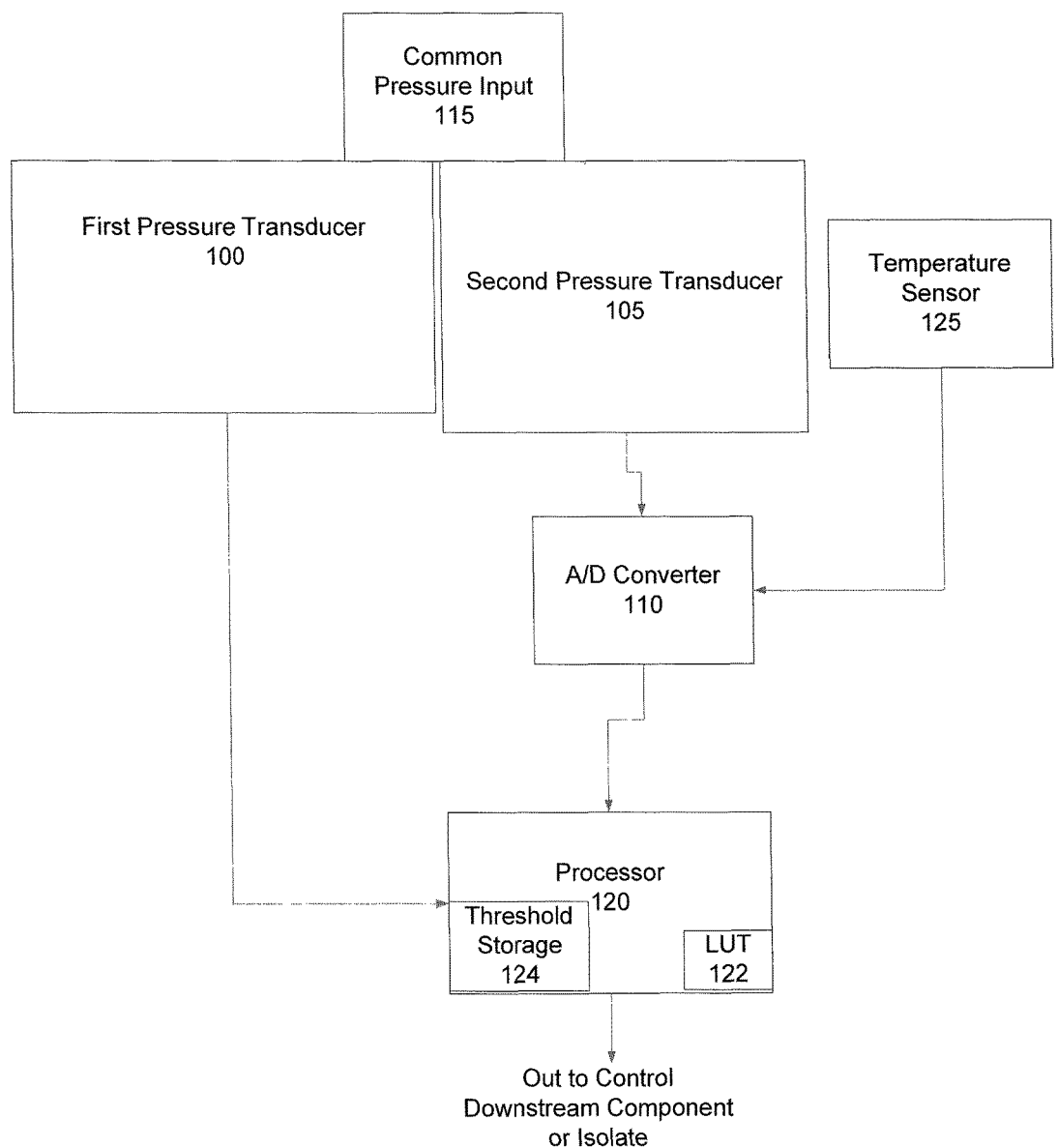
FIG. 1 is a block diagram of a pressure detection system in accordance with aspects of the disclosure.

Referring to FIG. 1, there is shown a block diagram of a pressure detection system. The pressure detection system operates in a dual channel configuration in which a First Pressure Transducer 100 and a Second Pressure Transducer 105 share a Common Pressure Input 115. The First Pressure Transducer 100 is assigned to a first channel and the Second Pressure Transducer is assigned to a second channel. The First Pressure Transducer 100 is a high accuracy pressure transducer designed to meet performance requirement over the dynamic operating range. For example, a Precision Transducer can be used as the high accuracy pressure transducer. The Precision Transducer exhibits a small drift.

For example, a Precision Transducer may have an accuracy of about +−0.047% accuracy of full scale over the maximum temperature range with a drift of less than +−0.01% of full scale per year. The temperature range can be from about −55 to about 125° C. The accuracy, drift and temperature range disclosed herein are just examples, and the actual accuracy, drift and temperature range may vary from device to device.

The Second Pressure Transducer 105 is a less accurate pressure transducer, and typically will be low cost. The less accurate pressure may have an accuracy about +−0.85% of full scale for a given temperature range. Additionally, a less accurate pressure transducer may be accurate at a specific temperature; however, the accuracy may vary over a temperature range. Additionally, a less accurate pressure transducer may be accurate at initial installation; however the accuracy may vary over time. Additionally, a less accurate pressure transducer may be accurate at a given pressure range, however, the accuracy varies outside the given pressure range.

Figure 3:
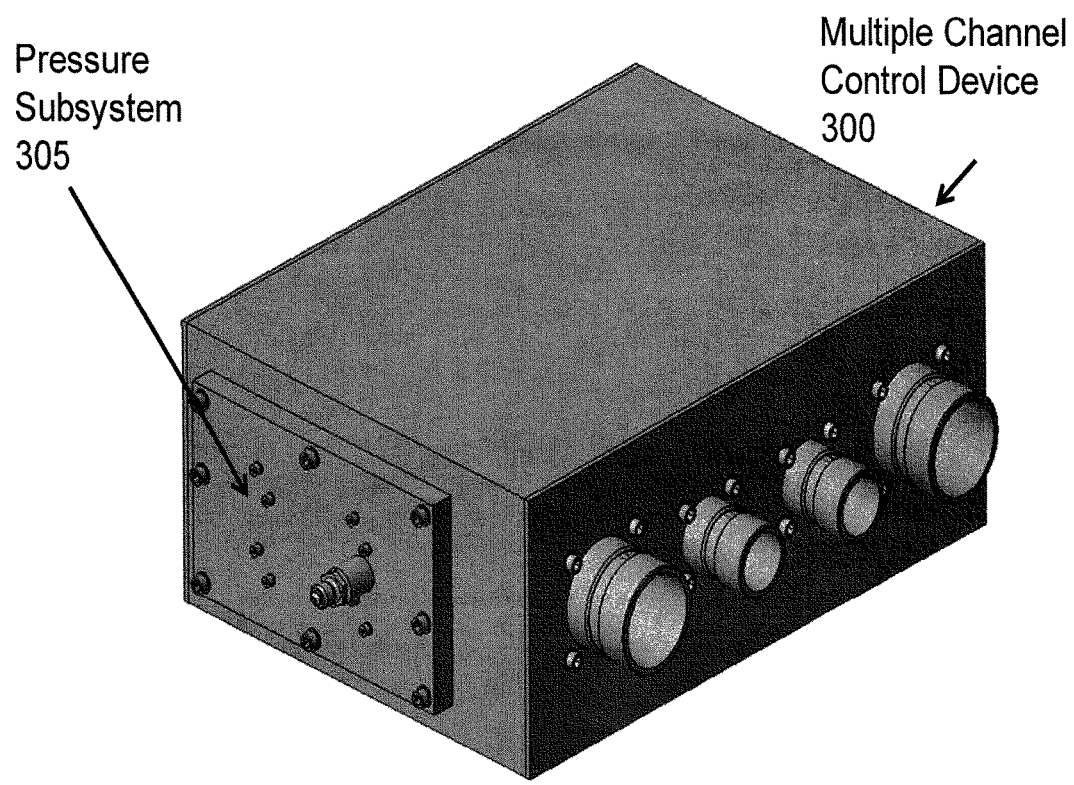
FIG. 3 illustrates an example of a Multiple Channel Control Device having pressure detection in accordance with aspects of the disclosure.

The pressure detection system can be used to detect pressure as part of a Full Authority Digital Engine Control (FADEC) system, an example of such a control device for the system is depicted in FIG. 3.

The pressure detection system can be used to detect pressure through a cable, hose, channel or pipe. The Common Pressure Input 115 can be a nipple or nozzle that is connected to a cable, hose, channel or pipe. The nipple or nozzle is communication with a pipe or channel having a splitter to source the First Pressure Transducer 100 and the Second Pressure Transducer 105.

In this configuration, the two pressure transducers measure the same input and thus should have the same pressure detection or reading.

The system also includes an A/D Converter 110 to convert the analog voltage signal output (detected pressure) from the Second Pressure Transducer 105 into a digital form for processing. As illustrated in FIG. 1, the A/D Converter 110 is separate from the Second Pressure Transducer 105; however, some lower accuracy pressure transducers have a built-in A/D Converter, and therefore a separate A/D Converter is not required.

Additionally, FIG. 1 illustrates that the output of the First Pressure Transducer is not input into the separate A/D Converter 110 because a high accuracy pressure transducer typically includes a built-in A/D Converter 110. However, the A/D Converter can be separate, similar to the lower accuracy pressure transducer depicted in FIG. 1, i.e., Second Pressure Transducer 105.

The pressure detection system also includes a Processor 120. The Processor 120 can be located on Electronic Circuit Cards such as a part of a control circuit. The Processor 120 receives as an input, the digital signal(s) from the A/D Converter 110 (representing the detected pressure from the Second Pressure Transducer 105) and the signal from the First Pressure Transducer 100 (the signal indicating a detected pressure from the First Pressure Transducer 100).

The Processor 120 includes a memory. In memory, a Look up Table (LUT) 122 and a predetermined update threshold (stored in a Threshold Storage 124) is stored.

The Processor 120 periodically recalibrates or updates the LUT 122 based on the detected pressure from the First Pressure Transducer 100. The recalibration accounts for drift and temperature effects on the Second Pressure Transducer 105, since it is a lower accuracy pressure transducer. Since the First Pressure Transducer 100 is a high accuracy pressure transducer, the drift and temperature effects are minimal.

The update period can be fixed or variable. For example, the update period can be daily, weekly or monthly, etc. Additionally, the update period can vary over time. For example, the update period can be initially set at monthly. As the system is used and ages, the update period can be shortened.

The predetermined update threshold is used by the Processor 120 to determine whether to update the LUT 122 based on a difference between the detected pressures from the First Pressure Transducer 100 and the Second Pressure Transducer 105 (adjusted using the LUT 122). If the difference is greater than the predetermined update threshold, the LUT 122 is not updated. This is because if the difference is greater than the predetermined update threshold, it is indicative of either the First Pressure Transducer 100 or the Second Pressure Transducer 105 malfunctioning.

In an aspect of the disclosure, the Processor 120 can further determine which of the First Pressure Transducer 100 or the Second Pressure Transducer 105 is malfunctioning. One way of determining which Pressure Transducer is malfunctioning is by comparing the current detected value from each of the Pressure Transducers with past or historic detected values. The historic detected values for each of the Pressure Transducers can be stored for a predefined period of time. For example, the last X detected values can be stored. When a current detected value deviates more than a specific threshold from the historic detected values for a respective Pressure Transducer, it is indicative of the Pressure Transducer malfunctioning (especially if the current detected value from the other Pressure Transducer is within the specific threshold of its historic detected value). For comparison, an average of the historic detected values can be used. Alternative, a range between a minimum and a maximum of the historic detected values can be used, e.g., if the current detected value is within the range.

Another way is to create a model to compare the current detected value from each Pressure Transducer (actual) with an expected detected value. The expected detected value can be based on temperature readings, speed of an engine, power levels, pressure detected by other pairs of Pressure Transducers etc.

At this point, the Processor 120 can set an error Flag and electrically isolate, the First Pressure Transducer 100 and/or the Second Pressure Transducer 105. For example, if the pressure detection system is a part of an FADEC, the Processor 120 can electrically isolate one or both of the pressure transducers 100 and/or 105 from the rest of the FADEC as to not affect the control, e.g., in order to prevent downstream error resulting from a faulty pressure measurement. In another aspect of the disclosure, if the error Flag is set, both pressure transducers 100 and 105 are electrically isolated. In another aspect of the disclosure, if the Processor 120 can determine which pressure transducer is malfunctioning and which is valid, the Processor 120 only electrically isolates the malfunctioning pressure transducer and uses the detected pressure from the other to generate one or more control parameters for the downstream component. In another aspect of the disclosure, if the Processor 120 can determine which pressure transducer is malfunctioning and which is valid, and the valid one is the First Pressure Transducer 100, the Processor 120 only electrically isolates the malfunctioning Second Pressure Transducer 105 and uses the detected pressure from the First Pressure Transducer 100 to generate one or more control parameters for the downstream component. In contrast, if the valid detection is from the Second Pressure Transducer 105, the Processor 120 can electronically isolate both the First Pressure Transducer 100 and the Second Pressure Transducer 105.

Prior to installation, the LUT 122 is configured and populated with temperature and pressure relationships. The configuration process includes monitoring the output of the Second Pressure Transducer 100 at known pressures and temperature conditions. The temperature conditions are varied and the detected pressure is recorded. In an aspect of the disclosure, the temperature conditions can be varied (where the pressure is fixed) to simulate the expected environment in which the system may be deployed. Similarly, the known pressure can be varied (where the temperature is fixed). The detected pressure is recorded. In an aspect of the disclosure, the pressure can be varied to simulate the expected pressure.

A predetermined number of detected pressures are recorded during this configuration process to create the LUT 122 at known pressure input and temperature conditions.

Once the LUT 122 is created and stored, the Processor 120 uses the LUT 122 to convert the detected pressure from the Second Pressure Transducer 105 into a "calibrated" or "corrected" detected pressure for the temperature conditions that the Second Pressure Transducer 105 experiences, e.g., the LUT 122 has correction or adjustment values.

In this regard, the system includes a Temperature Sensor 125 placed in the vicinity of the Second Pressure Transducer 105. The Temperature Sensor 125 is configured to sense the temperature in an area surrounding the Second Pressure Transducer 105. The sensed temperature is input into an A/D Converter 110 and to the Processor 120.

In another aspect of the disclosure, the sensed temperature is feed directly into the Processor 120.

The sensed temperature is used as a key to read the LUT 122 when the Processor 120 receives the detected pressure from the Second Pressure Transducer 105.

Figure 2:
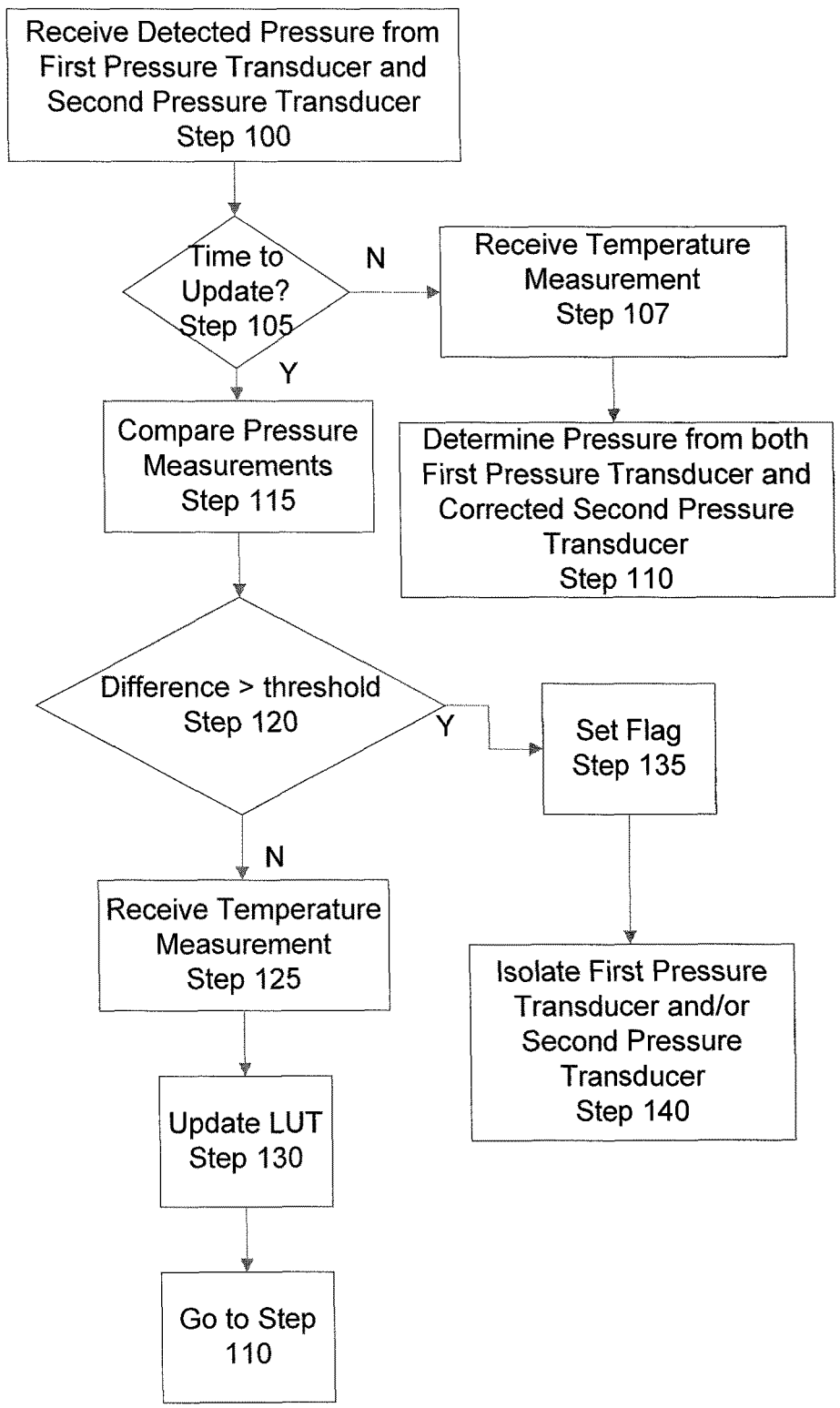
FIG. 2 is a flow chart that illustrates a pressure detection method in accordance with aspects of the disclosure.

FIG. 2 illustrates a flow chart for a method of detecting pressure in accordance with aspects of the disclosure.

At Step 100, the Processor 120 receives signals indicating the detected pressure readings from both the First Pressure Transducer 100 and the Second Pressure Transducer 105 (either directly or indirectly via the A/D Converter 110). The Processor 120 determines whether it is time to update the LUT 122 (Step 105). The Processor 120 sets a timer or clock with the update period. The timer or clock is started after a previous update and is reset each time the LUT 122 is updated.

If the timer or clock has not expired ("N" at Step 105), the Processor 120 determines it is not time to update the LUT 122 and subsequently determines the pressure input into both the First Pressure Transducer 100 and the Second Pressure Transducer 105 based on the signals received in Step 100 (Step 110). The Processor 120 retrieves the LUT 122 for the Second Pressure Transducer 105 and reads out the correction or adjustment value from the LUT 122 based on the signal received from the Second Pressure Transducer 105 and a temperature reading received from the Temperature Sensor 125 (at Step 107). The Processor 120 may have to interpolate the correction value or adjustment for the specific pressure detected.

The adjusted pressure and the detected pressure from the First Pressure Transducer should be substantially the same. The Processor 120 can report the determined pressure downstream. In another aspect of the disclosure, the Processor 120 also includes control logic for controlling a downstream component, such as an engine. Therefore, instead of reporting the determine pressure downstream after determining the pressure at Step 110, the Processor 120 determines one or more control parameters using the control logic, to control the downstream component. The control can include controlling a solenoid or fluid valve.

If the timer or clock has expired ("Y" at Step 105), the Processor 120 determines it is time to update the LUT 122. At Step 115, the signals from the First Pressure Transducer 100 and the Second Pressure Transducer 105 (adjusted using the current correction or adjustment values from the LUT 122) are compared, e.g., the detected pressures. If the Processor 120 determines that the difference between the two are greater than the predetermined updated threshold ("Y" at Step 120), the Processor 120 sets an error Flag at Step 135.

Based on the set error Flag, the Processor 120 isolates one or both of the First Pressure Transducer 100 and the Second Pressure Transducer 105 as a fault prevention technique (Step 140).

If the Processor 120 determines that the difference between the two are less than or equal to the predetermined update threshold ("N" at Step 120), the LUT 122 can be updated (and greater than a second threshold). The second threshold can be used to avoid updating the LUT 122 based on precision differences. For example, if one of the Pressure Transducers uses two decimal places and the other uses three, the compared values would be different.

The Processor 120 receives a temperature measurement from the Temperature Sensor 125 (Step 125).

At Step 130, the Processor 120 updates the LUT 122 based on the received temperature measurement for the temperature surrounding the Second Pressure Transducer 105 and the detected pressures which are indicated by signals from both pressure transducers (adjusted detected Pressure from the Second Pressure Transducer 105). As described above, the LUT 122 is initially populated during configuration, e.g., initial build and integration/test. The table will have correction or adjustment values at specific temperature/pressure combinations. For example a correction value will exist at 80 C and 100 PSI and another value at 90 C and 100 PSI and another at 80 C and 110 PSI etc.

The Processor 120 compares the detected pressure indicated by the signal from the high accuracy transducer to a LUT adjusted pressure value from the less accurate transducer. If the two values are within an acceptable offset then the table will not be updated. If the comparison is outside an acceptable offset requiring a table update then the LUT 122 is updated (and also less than the predetermined updated threshold).

Once the LUT 122 is updated, the Processor 120 determines the pressure in a similar manner as described in Step 110.

FIG. 3 illustrates an example of a Multiple Channel Control Device 300 having pressure detection in accordance with aspects of the disclosure. The Multiple Channel Control Device 300 can be used in any control system where a control parameter is impacted or determined based on a pressure detection. For example, the Multiple Channel Control Device 300 depicted in FIG. 3 can be used to control an engine, such as in an FADEC system. The Multiple Channel Control Device 300 includes a Pressure Subsystem 305. The Pressure Subsystem 305 will be described in detailed with respect to FIGS. 6-9.

Figure 4:
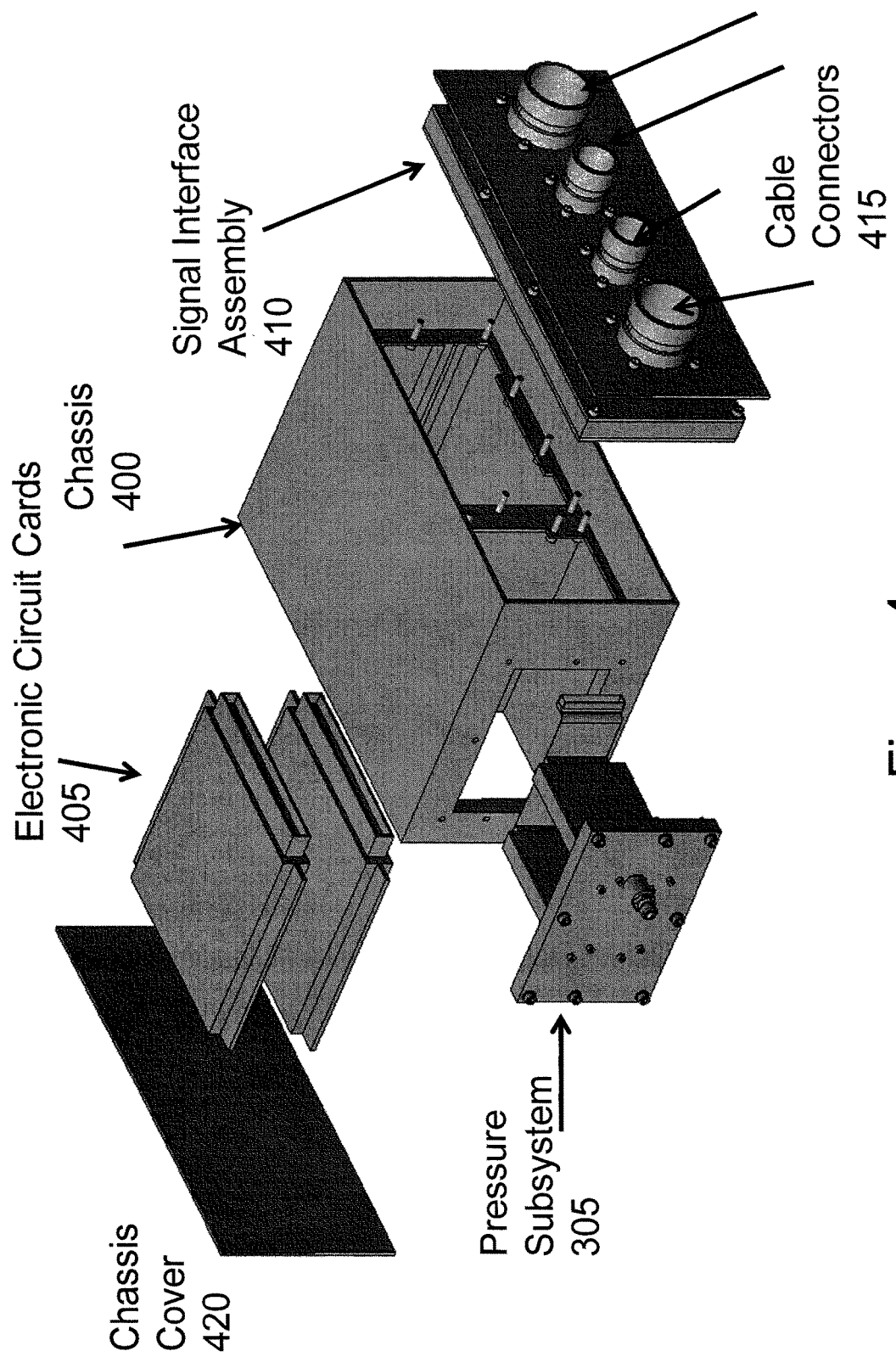
FIG. 4 illustrates an exploded view of the Multiple Channel Control Device in accordance with aspects of the disclosure.
Figure 5:
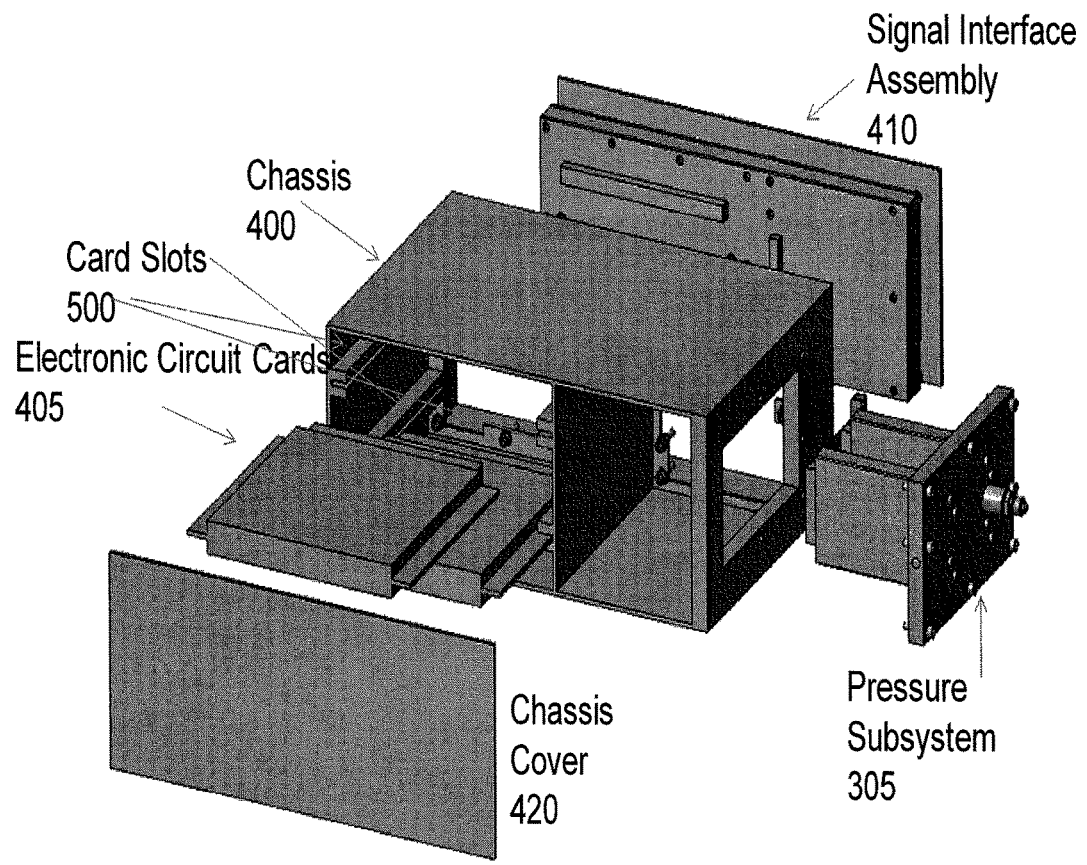
FIG. 5 illustrates another exploded view, from a different angle, of the Multiple Channel Control Device in accordance with aspects of the disclosure.

FIGS. 4 and 5 depict exploded views of the Multiple Channel Control Device 300. The Multiple Channel Control Device 300 includes a Chassis 400, which serves as a housing. The Chassis 400 has an opening on one of its sides for allowing the Pressure Subsystem 305 to be inserted during mounting. The Chassis 400 further includes a plurality of thru-holes. The plurality of thru-holes are on the same side as the opening. The Pressure Subsystem 305 is mounted to the Chassis 400 via the thru-holes. An affixing device is used to mount the Pressure Subsystem 305 to the Chassis 400, such as, but not limited to screws or bolts.

The Multiple Channel Control Device 300 includes Electronic Circuit Cards (collectively 405). As depicted, the Multiple Channel Control Device 300 has two Electronic Circuit Cards, e.g., Electronic Circuit Card A and Electronic Circuit Card B, and thus the Multiple Channel Control Device 300 has two channels. In an aspect of the disclosure, each Electronic Circuit Card 405 includes the same hardware. Each Electronic Circuit Card 405 includes hardware for controlling a downstream device, e.g., engine and fluid valve or solenoid, such as, and including the Processor 120 as described above for performing pressure detection and updating of the LUT in accordance with aspects of the disclosure. Additionally, in an aspect of the disclosure, each Electronic Circuit Card 405 contains a Temperature Sensor 125. Alternatively, the Temperature Sensor 125 can be attached to the Signal Interface Assembly 410. Further, in an aspect of the disclosure, the above mentioned A/D converter can be included in the Electronic Circuit Card.

The two channels are provided for redundancy. If one of the channels is defective, the redundancy allows for the device to still be able to control a downstream device without interruption. One of the two Electronic Circuit Cards, e.g., Card A or Card B is set as the master card and the other is set as a stand-by card. If the master card fails, then the stand-by card takes over.

The Pressure Subsystem 305 includes two Pressure Transducers 100/105. The two Pressure Transducers were described above and will not be described again. One pressure transducer is assigned to each channel. Thus, one pressure transducer is assigned to Electronic Circuit Card A and the other pressure transducer is assigned to Electronic Circuit Card B.

As can be seen from FIG. 5, the Chassis 400 also includes a plurality pairs of Card Slots 500. A pair of Card Slots is configured to hold an Electronic Circuit Card 405. As depicted, the Chassis 400 includes two pairs of Card Slots 500, one pair for each Electronic Circuit Card. When mounting an Electronic Circuit Card 405, the Electronic Circuit Card 405 slides into position along the pair of Card Slots. The Chassis 400 includes a second opening on the side where the Electronic Circuit Cards 405 are mounted through.

The Multiple Channel Control Device 300 further including a Signal Interface Assembly 410. The inside facing surface of the Signal Interface Assembly 410 includes connection for each of the Electronic Circuit Cards 405 and the Pressure Subsystem 305. The Pressure Transducers 100/105 in the Pressure Subsystem 305 can communicate with each of the Electronic Circuit Cards 405 through the Signal Interface Assembly 410. Additionally, signals from an aircraft avionic system are transmitted through the Signal Interface Assembly 410 to the Electronic Circuit Cards 405. Control Signals from the Electronic Circuit Cards 405 and thus the channels, are transmitted to downstream components through the Signal Interface Assembly 410.

The Signal Interface Assembly 410 further includes a plurality of Cable Connectors 415. The Cable Connectors 415 are configured to mate with signal cables. In an aspect of the disclosure, the signal cables connect the aircraft avionic system with the Multiple Channel Control Device 300. The signal cables also connect the downstream components to the Multiple Channel Control Device 300. Each channel uses two signal cables. The signal cables are not shown. The Signal Interface Assembly 415 is mounted to the Chassis 400.

The Multiple Channel Control Device 300 includes a Chassis Cover 420. The Chassis Cover 420 covers the second opening in the Chassis which allows the Electronic Circuit Cards 405 to be mounted.

Figure 6:
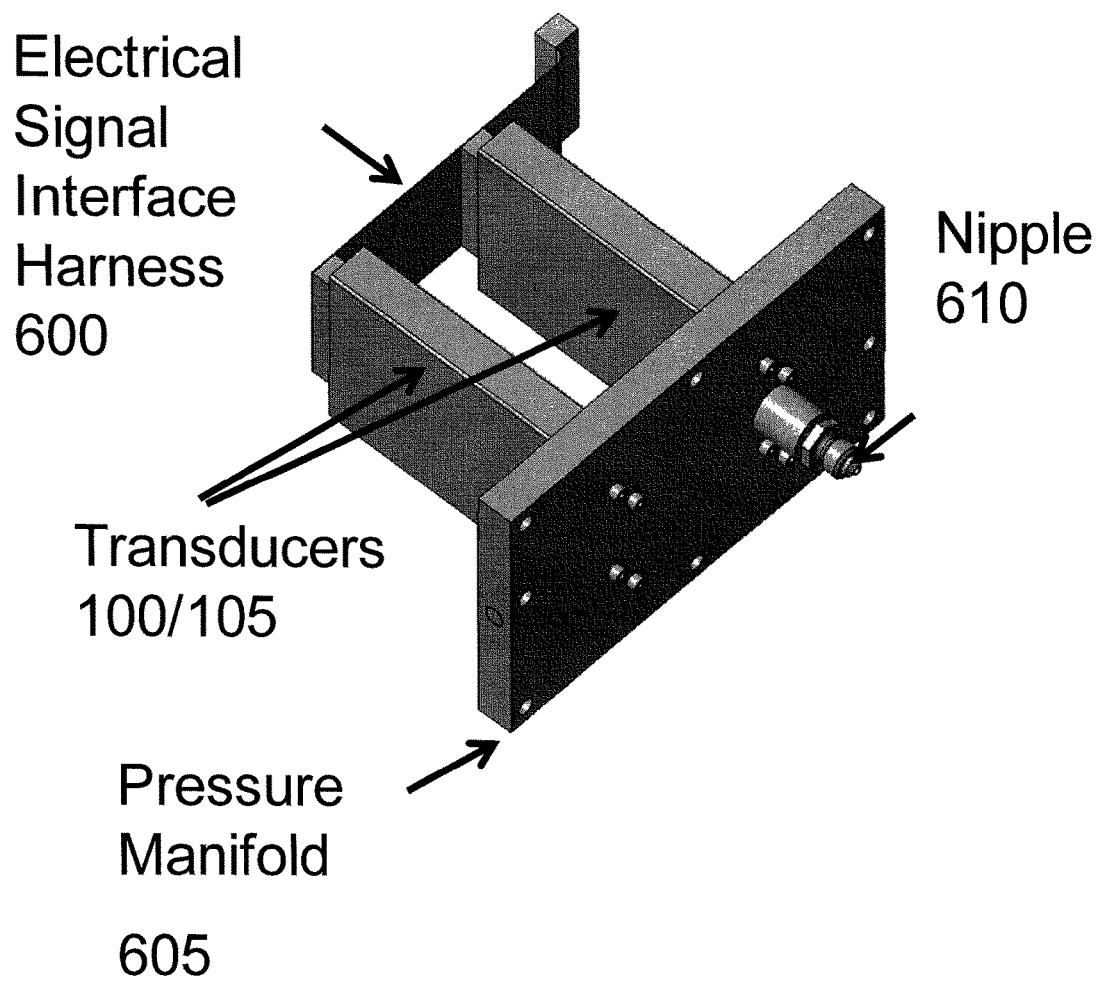
FIG. 6 illustrates an example of a Pressure Subsystem for the Multiple Channel Control Device in accordance with aspects of the disclosure.

FIG. 6 illustrates an example of a Pressure Subsystem 305 for the Multiple Channel Control Device 300 in accordance with aspects of the disclosure. The Pressure Subsystem 305 includes an Electrical Signal Interface Harness 600. The Electrical Signal Interface Harness 600 is coupled to the Pressure Transducers 100/105. Signals from each of the Pressure Transducers are transmitted to the respective Electronic Circuit Card through the Electrical Signal Interface Harness 600. The Electrical Signal Interface Harness 600 can be a flexible printed circuit board. The Electrical Signal Interface Harness 600 is connected to the Signal Interface Assembly 410. As seen in both FIGS. 4 and 6, the Electrical Signal Interface Harness 600 includes a connector at one end of the Harness. The connector connects to the Signal Interface Assembly 410 via a corresponding connector, e.g., connection.

The Pressure Subsystem 305 further includes two Pressure Transducers 100/105, e.g., First Pressure Transducer 100 and the Second Pressure Transducer 105 and a Pressure Manifold 605. The Pressure Transducers 100/105 are coupled to the Pressure Manifold 605 at one end and the Electrical Signal Interface Harness 600 at the other. The Pressure Manifold 605 will be described in detail with respect to FIGS. 7-9. The Pressure Subsystem 305 further includes a Nipple 610. The Nipple 610 serves as a common pressure input to the Pressure Subsystem 305. The Nipple 610 mates with an opening in the Pressure Manifold 605. A hose or pipe is inserted over the Nipple 610. The hose or pipe is not shown. One end of the hose or pipe mates with the Nipple 610 and the other end of the hose or pipe mates with a port in a downstream component under control. For example, an end of the hose or pipe mates with a port in an engine. Pressure within the downstream component, e.g., engine, is communicated to the Nipple 610 via the hose or pipe.

Figure 7:
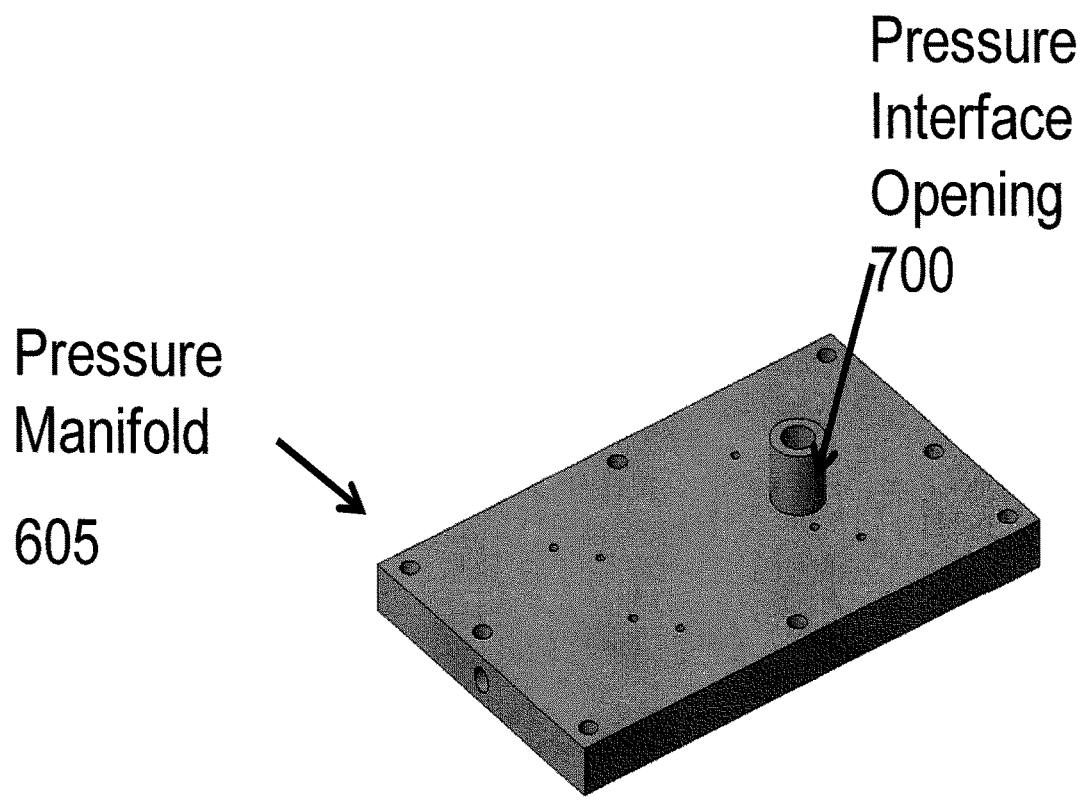
FIG. 7 illustrates an example of a Pressure Manifold in accordance with aspects of the disclosure.
Figure 8:
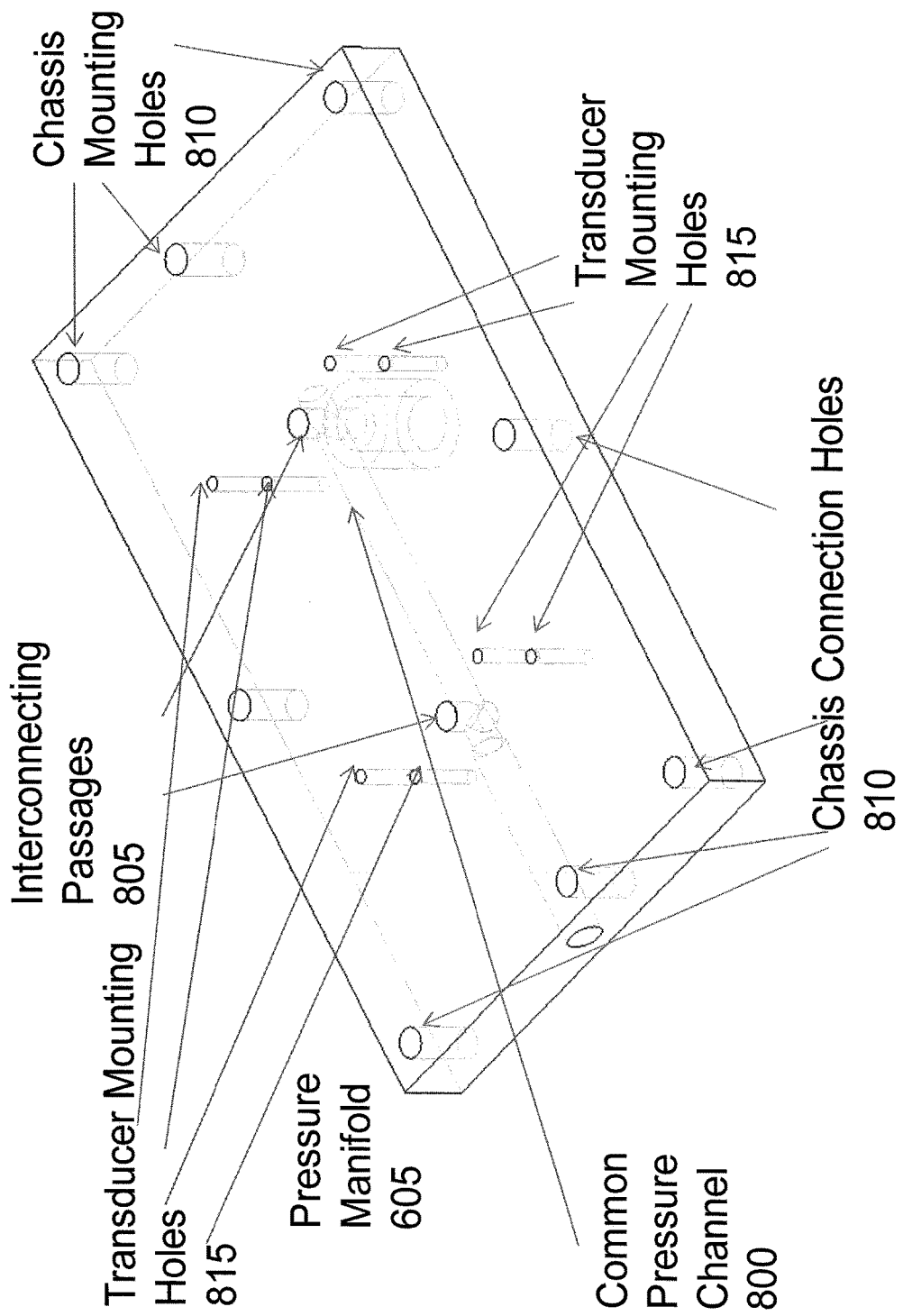
FIG. 8 illustrates a perspective view of the Pressure Manifold showing the internal components of the Pressure Manifold in accordance with aspects of the disclosure.
Figure 9:
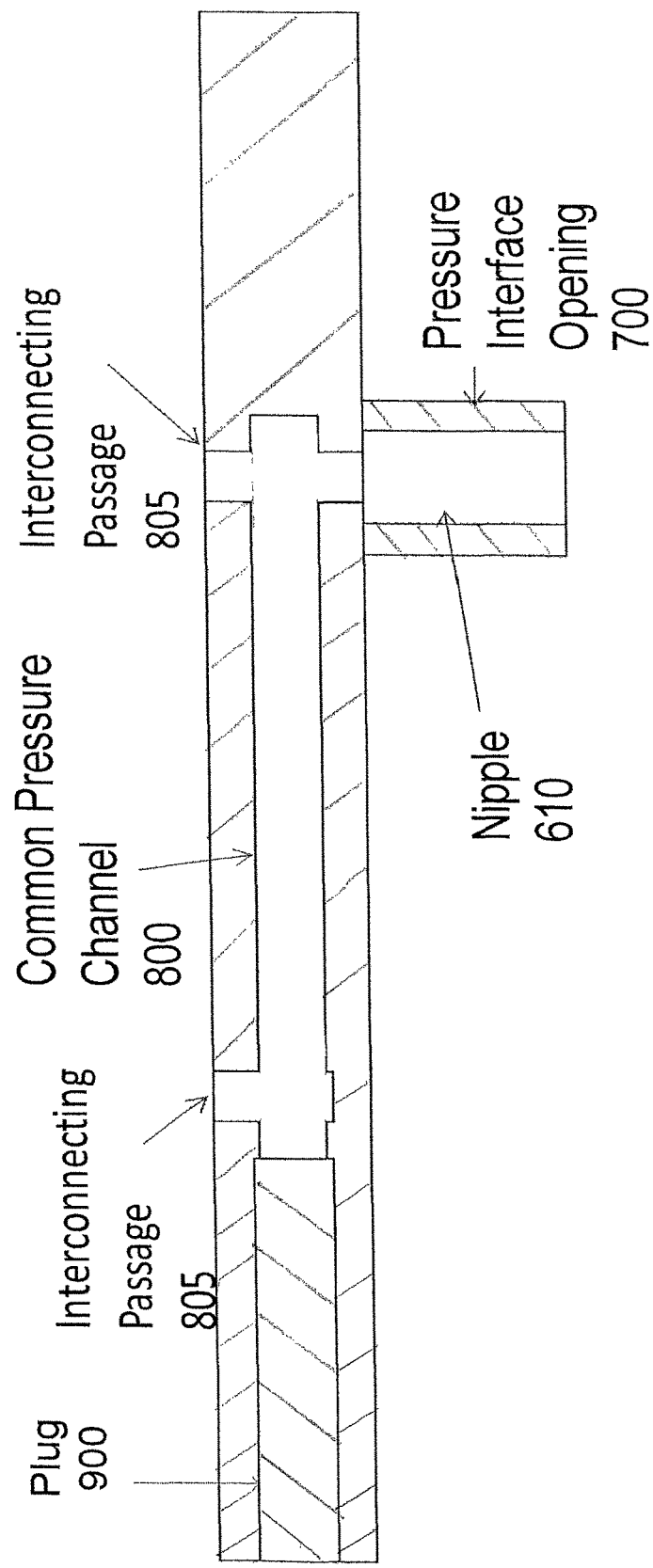
FIG. 9 illustrates a sectional view of the Pressure Manifold in accordance with aspects of the disclosure.

FIGS. 7-9 depict an example of a Pressure Manifold 605 in accordance with aspects of the disclosure. The Pressure Manifold 605 includes a Pressure Interface Opening 700. The Pressure Interface Opening 700 is a thru-hold in the Pressure Manifold 605. The Pressure Interface Opening 700 allows the pressure from a downstream component, such as the engine to enter the Pressure Manifold 605. As seen in the sectional view in FIG. 9, the Nipple 610 is located within the Pressure Interface Opening 700. In an aspect of the disclosure, the Nipple 610 mates with the Pressure Interface Opening 700. The Nipple 610 connects with a Common Pressure Channel 800. Intersecting the Common Pressure Channel 800 are two Interconnecting Passages 805, one for each Pressure Transducer 100/105. The Interconnecting Passages 805 communicate the pressure from the Common Pressure Channel 800 to the respective Pressure Transducer 100/105 such that the pressure seen by the respective Pressure Transducer is equal. The location of the Interconnecting Passages corresponding to the position where the respective Pressure Transducer is mounted to the Pressure Manifold 605.

The Common Pressure Channel 800 extends between the location where the First Pressure Transducer 100 is mounted and the location where the Second Pressure Transducer 105 is mounted. The Common Pressure Channel is substantially perpendicular to the Pressure Transducers 100/105. A solid Plug 900 is positioned at one end of the Common Pressure Channel 800 to ensure that the pressure is communicated to both Interconnecting Passages 805.

The Pressure Manifold 605 includes a plurality of Transducer Mounting Holes 815. As depicted in FIG. 8, there are four Transducer Mounting Holes for each Pressure Transducer. The number of Transducer Mounting Holes can vary. An affixing device is used to mount the Pressure Transducers 100/105 to the Pressure Manifold 605, such as, but not limited to screws or bolts. When mounted, the sensing element of the Pressure Transducer opposes the Interconnecting Passages 805 such that the pressure is communicated to the sensing elements.

The Pressure Manifold 605 includes a plurality of Chassis Mounting Holes 810. As depicted in FIG. 8, there are eight Chassis Mounting Holes 810. The number of Chassis Mounting Holes can vary. The Pressure Subsystem 305 is mounted to the Chassis via the Chassis Mounting Holes 810. An affixing device is used to mount the Pressure Subsystem 305 to the Chassis 400, such as, but not limited to screws or bolts.

The Pressure Subsystem 305 is used to continuously monitor pressure in the downstream component, such as, but not limited to an engine. In an aspect of the disclosure, the pressure in the engine is used as a feedback signal to the Electronic Circuit Cards 405. Pressure is detected by both Pressure Transducers 100/105, e.g., the First Pressure Transducer 100 and the Second Pressure Transducer 105. Signals representing the detected pressure are transmitted via the Electrical Signal Interface Harness 600 and the Signal Interface Assembly 410 to a respective Electronic Circuit Card. For example, a signal from the First Pressure Transducer 100 can be transmitted to Electronic Circuit Card A, and a signal from the Second Pressure Transducer can be transmitted to Electronic Circuit Card B. Each Electronic Circuit Card 405 includes a Processor and Memory as described above in FIG. 1.

In an aspect of the disclosure, both Electronic Circuit Cards execute the method described in FIG. 2. Each Electronic Circuit Card 405 maintains a redundant LUT with updated information. Further, the memory in each of the Electronic Circuits Cards 405 stores an predetermined update threshold as described above. The Processor 120 in each of the Electronic Circuit Cards refers to the predetermined update threshold to determine whether to update the LUT.

As described above, when the difference between the pressure detected by the first pressure transducer and the corrected pressure detected by the second pressure transducer is greater than the predetermined update threshold, instead of updating the LUT, the one or both of the Pressure Transducers are electrically isolated. In an aspect of the disclosure, the Processor 120 in each the electronic circuit card, electrically isolates one or both of Pressure Transducers. In an aspect of the disclosure, when one or both of the Pressure Transducers are isolated, the Processor 120 can also generate an alert and communicate the same to the aircraft avionics system. In an aspect of the disclosure, the Processor 120 in the master card can further determine which of the First Pressure Transducer 100 or the Second Pressure Transducer 105 is malfunctioning as described above. If the Processor 120 determines that one of the Pressure Transducers 100/105 is generating a valid detection, in an aspect of the disclosure, only the malfunctioning Pressure Transducer is electrically isolated and the channel associated with the valid output can used for subsequent pressure determination and control. The Electronic Circuit Card associated with the malfunctioning Pressure Transducer will not transmit any signal from the malfunctioning Pressure Transducer to the other Electronic Circuit Card.

The memory in each of the Electronic Circuit Cards can further store historical pressure data for First Pressure Transducer 100 or the Second Pressure Transducer 105.

Additionally, each Electronic Circuit Card 405 determines the pressure from signals from both Pressure Transducers 100/105 using the LUT 122 and temperature sensed by the respective Temperature Sensor 125 in the Electronic Circuit Card. In an aspect of the disclosure, each Electronic Circuit Card can communicate with the other Electronic Circuit Card. Thus, signals received by a respective Electronic Circuit Card can be transmitted to the other Electronic Circuit Cards, including the signals regarding pressure output by the Pressure Transducer when the Pressure Transducer is not malfunctioning.

After the pressure is determined, the Processor 120 in each Electronic Circuit Card determines at least one control parameter using the determined pressure. For example, the Processor 120 can control an amount of fluid such as fuel to an engine based on the determined pressure. The at least one control parameter can be based on the pressure alone, e.g., where there is no change in the information from the aircraft avionics system or in signals from other sensors or based on a combination of pressure and information from the aircraft avionics system.

The Multiple Channel Control Device 300 receives various signals from the aircraft avionic system and other sensors via signal cables connected to the aircraft avionic system and/or sensor at one end and the Cable Connectors 415 at the other end. Signals from the aircraft avionic system may include air density, altitude and throttle level position. The other sensors may include a temperature sensor(s)

coupled to an engine. The signal(s) from the temperature sensor(s) indicate engine temperature(s). Signals from the sensors can be directly input to the Multiple Channel Control Device 300. In another aspect of the disclosure, the signals from the sensors are relayed through the aircraft avionic system. While each Electronic Circuit Card determines the at least one control parameter, only the Electronic Circuit Card that is set as the master card communicates the determined at least one control parameter downstream. The at least one operating parameters can include, but is not limited to, fuel flow, stator position, and bleed valve position. The operating parameters are sent as electrical signals or commands to the downstream component(s). The operating parameters can be used to control the engine thrust and control various engine actuators to make the engine accelerate or decelerate.

For example, a pilot can command an aircraft to climb to a new altitude. The climb requires more thrust from an engine. If additional engine thrust was to climb to a different altitude, there is also a change in ambient pressure. The change in ambient pressure will be detected by an ambient pressure sensor. The ambient pressure sensor transmits a signal representing the detected pressure to the Multiple Channel Control Device 300. Additionally, the avionics system provides a command signal to the Multiple Channel Control Device 300 via the Cable Connectors 415, to increase fuel flow to the engine. An increase in fuel flow results in the increase in thrust. An increase in fuel flow results in a change in pressure(s) within the engine. The change in pressure in the engine is detected by Pressure Transducers 100/105. For example, the Pressure Transducers 100/105 can detect High Pressure Turbine air pressure within the engine. The combination of detected pressures, e.g., within the engine and ambient air pressure, is used to calculate the correct fuel flow to the engine.

In another aspect of the disclosure, the Multiple Channel Control Device 300 can report the detected pressure to the aircraft avionics via the signal cables attached to the Cable Connectors 415.

The Processor 120 in each Electronic Circuit Card can be a microcontroller or microprocessor or any other processing hardware such as a CPU or GPU placed on the Electronic Circuit Card. The microcontroller or microprocessor includes at least one memory, such as, but not limited to, RAM, ROM and persistent storage.

In an aspect of the disclosure, the Processor can be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terms "Processor" as may be used in the present disclosure may include a variety of combinations of hardware including a control circuit, hardware and software, and storage devices. The Processor may include a plurality of individual circuit components linked to perform collaboratively, or may include one or more stand-alone components.

While the present disclosure has been described in connection with embodiments of the various figures, it is to be understood that other similar embodiments may be used or modifications and additions may be made to the described embodiment for performing the same function of the present disclosure without deviating there from. Therefore, the present disclosure should not be limited to any single embodiment, but rather construed in breadth and scope in accordance with the recitation of the appended claims.

What is claimed is:

1. A pressure detection system comprising:
a pressure manifold comprising a first pressure transducer and a second pressure transducer, where a channel extends between a location where the first pressure transducer is mounted to the pressure manifold and a location where the second pressure transducer is mounted to the pressure manifold, a first interconnecting passage intersects the channel providing communication between the channel and the first pressure transducer and a second interconnecting passage intersects the channel providing communication between the channel and the second pressure transducer, when mounted, the first pressure transducer and the second pressure transducer are parallel to each other with one end of each of the first pressure transducer and the second pressure transducer mounted to the pressure manifold and another end of each of the first pressure transducer and the second pressure transducer attached to a signal harness, the first pressure transducer and the second pressure transducer having a full scale of detection, the pressure manifold having a opening with a nipple inserted therein, the channel being in communication with the nipple, the pressure manifold being coupleable to a pressure port of a downstream component, thereby when coupled the first pressure transducer and the second pressure transducer receive a common pressure from the pressure port, the first pressure transducer being a different type than the second pressure transducer;
a storage device configured to store a look up table having a calibrated relationship between temperature and pressure for the second pressure transducer;
a processor comprising hardware configured to:
periodically update the look up table based on pressure detected by the first pressure transducer when a condition is met;
determine pressure within the downstream component based on the pressure detected by the first pressure transducer and a corrected pressure detected by the second pressure transducer; and
generate at least one control parameter for the downstream component based in part on the determined pressure,
wherein the second pressure transducer is a less accurate pressure transducer than the first pressure transducer, the first pressure transducer being a precision transducer.

2. The pressure detection system of claim 1, wherein the processor comprising hardware is further configured to update the look up table based on a difference between the pressure detected by the first pressure transducer and the corrected pressure detected by the second pressure transducer, the correction being based on the look up table.

3. The pressure detection system of claim 2, wherein the storage device further is configured to store an update limit threshold, and wherein when the difference between the pressure detected by the first pressure transducer and the corrected pressure detected by the second pressure transducer is greater than the update limit threshold, the condition is not met and the look up table is not updated.

4. The pressure detection system of claim 3, wherein when the difference between the pressure detected by the first pressure transducer and the corrected pressure detected by the second pressure transducer is greater than the update limit threshold, the processor comprising hardware is further configured to isolate at least one of the first pressure transducer and the second pressure transducer.

5. The pressure detection system of claim 1, wherein the downstream component is an engine including at least one solenoid.

6. The pressure detection system of claim 1, wherein the first pressure transducer is configured for end of life tolerances.

7. The pressure detection system of claim 1, wherein the processor comprising hardware is configured to receive a temperature measurement for an area surrounding the second pressure transducer, and wherein the processor comprising hardware updates the look up table based on the received temperature and a difference between the pressure detected by the first pressure transducer and the corrected pressure detected by the second pressure transducer.

8. The pressure detection system of claim 1, wherein the storage device is further configured to store historical pressure detected values for each of the first pressure transducer and the second pressure transducer for a preset period of time.

9. The pressure detection system of claim 8, wherein when the difference between the pressure detected by the first pressure transducer and the corrected pressure detected by the second pressure transducer is greater than an update limit threshold, the processor is configured to determine a malfunction of at least one of the first pressure transducer and the second pressure transducer by comparing the pressure detected by the first pressure transducer with corresponding historical pressure detected values and comparing the corrected pressure detected by the second pressure transducer with corresponding historical pressure detected values and when a current pressure detected or a current corrected pressure is more than a preset threshold difference from the respective corresponding historical pressure detected values, the processor determines a malfunction.

10. The pressure detection system of claim 9, wherein when the determined malfunction is in the first pressure transducer, the processor is configured to isolate both the first pressure transducer and the second pressure transducer, wherein when the determined malfunction is the second pressure transducer, the processor is configured to isolate the second pressure transducer without isolating the first pressure transducer.

11. A computer readable storage device having a program of instructions, which when executed by a processor causes the processor to perform:
comparing received pressure detection results from a first pressure transducer and a second pressure transducer having a common pressure source as an input, the pressure detection result of the second pressure transducer being corrected prior to comparing;
updating a look up table having a relationship between pressure and temperature for the second pressure transducer based on the result of the comparing when a condition is satisfied;
store historical pressure detected values for each of the first pressure transducer and the second pressure transducer for a preset period of time;
determine pressure within a downstream component based on the pressure detected by the first pressure transducer and a corrected pressure detected by the second pressure transducer; and
generate at least one control parameter for the downstream component based in part on the determined pressure,
wherein when the difference between the pressure detected by the first pressure transducer and the corrected pressure detected by the second pressure transducer is greater than an update limit threshold, the instructions further cause the processor to determine a malfunction of at least one of the first pressure transducer and the second pressure transducer by comparing the pressure detected by the first pressure transducer with corresponding historical pressure detected values and comparing the corrected pressure detected by the second pressure transducer with corresponding historical pressure detected values and when a current pressure detected or a current corrected pressure is more than a preset threshold difference from the respective corresponding historical pressure detected values, the processor determines a malfunction in at least one of the first pressure transducer and the second pressure transducer, and wherein when the determined malfunction is in the first pressure transducer, the instructions further cause the processor to isolate both the first pressure transducer and the second pressure transducer, wherein when the determined malfunction is the second pressure transducer, the instructions further cause the processor to isolate the second pressure transducer without isolating the first pressure transducer.

* * * * *